No. 821,531. PATENTED MAY 22, 1906.
W. H. PEARCE.
TIP TANK WEIGHING MACHINE OR METER.
APPLICATION FILED JULY 20, 1903.
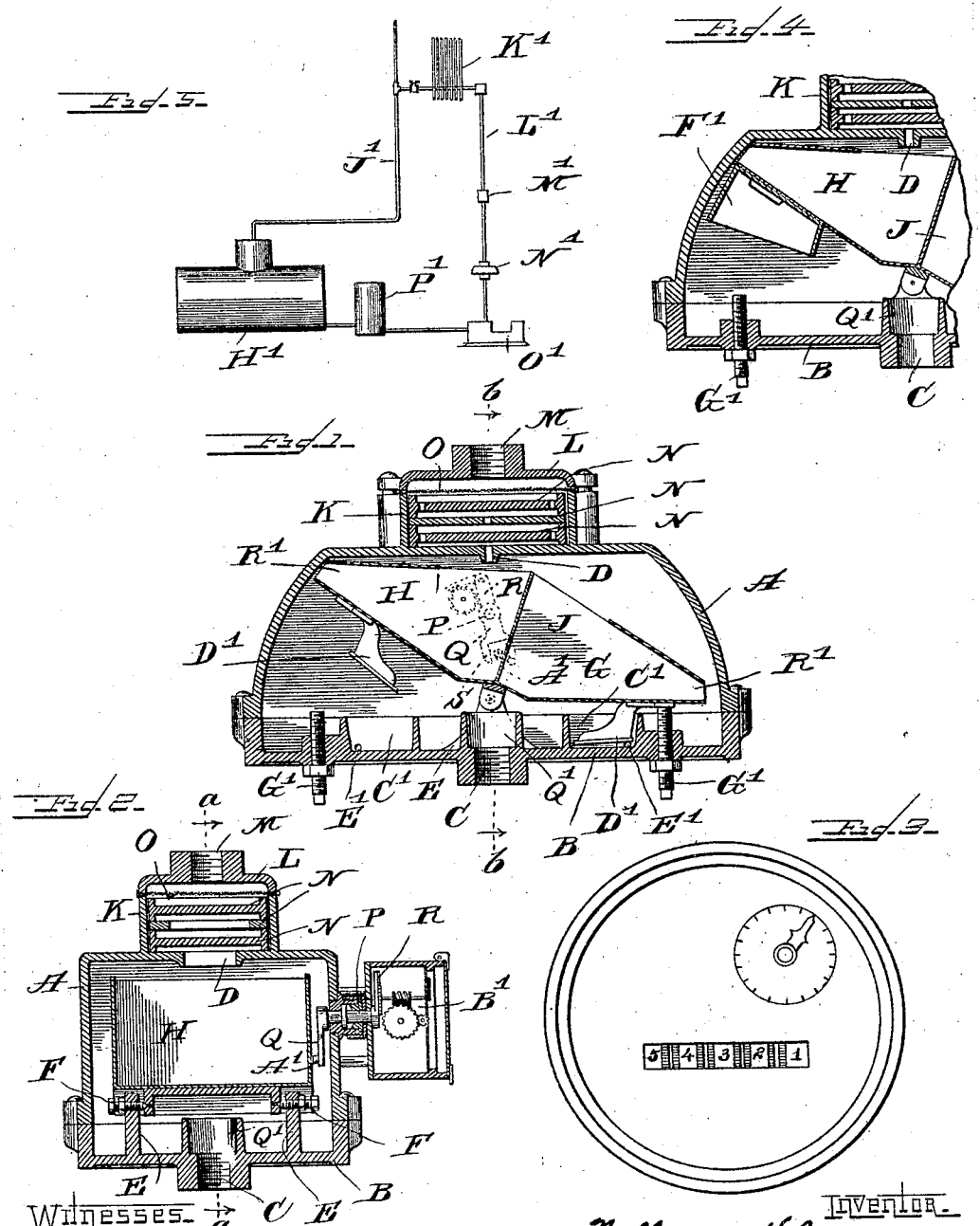

UNITED STATES PATENT OFFICE.

WILLIAM H. PEARCE, OF OAK PARK, ILLINOIS.

TIP-TANK WEIGHING-MACHINE OR METER.

No. 821,531.  Specification of Letters Patent.  Patented May 22, 1906.

Application filed July 20, 1903. Serial No. 166,397.

*To all whom it may concern:*

Be it known that I, WILLIAM H. PEARCE, a citizen of the United States, residing at Oak Park, in the county of Cook and State of Illinois, have invented a new and useful Tip-Tank Weighing-Machine or Meter, of which the following is a specification.

This invention relates to tip-tank weighing-machines or meters.

The object of the invention is to provide a construction of weighing-machine or meter which is simple in construction and efficient in operation.

A further object of the invention is to provide a weighing-machine or meter of the tip-tank type wherein the registering mechanism is not actuated until the tank is tipped or the weighing completed.

A further object of the invention is to provide a tip-tank weighing-machine or meter wherein the material to be weighed or measured is delivered to the weighing pans or receptacles uniformly and without danger of influencing or disturbing the accuracy of the weighing or measuring mechanism.

Other objects of the invention will appear more fully hereinafter.

The invention consists substantially in the construction, combination, location, and arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in central section on the line *a a*, Fig. 2, looking in the direction of the arrows. Fig. 2 is a view similar to Fig. 1 on the line *b b* of Fig. 1 looking in the direction of the arrows. Fig. 3 is a view in elevation of the dial-face of the meter or weighing-machine. Fig. 4 is a broken view in section on the same plane as Fig. 1, showing a slightly-modified arrangement. Fig. 5 is a view, somewhat diagrammatic, showing the application of a meter or weighing-machine embodying the invention to a heat-distributing system.

The same part is designated by the same reference-sign wherever it occurs throughout the several views.

In the construction of meters and weighing-machines of the class to which my invention relates it is exceedingly desirable to deliver the material to be weighed or measured to the meter or weighing-machine in such manner that the accuracy of the measurement or weight may not be impaired by the force of delivery of the material to the apparatus. It is also desirable in order to attain accuracy in the measurements or weight of the material, and especially in a tip-tank meter, that the center of gravity of the tipping portion of the apparatus be not altered or varied during the tipping operation. It is also desirable that the registering mechanism be not actuated until after the weighing operation has been completed, for otherwise the resistance of the clockwork mechanism associated with the registering mechanism and forming part thereof will interpose its resistance to the movements of the tipping pans in making a measurement, thereby detracting from the accuracy of the measurements to the extent of such friction. These and other objects, which will appear more fully hereinafter, are the objects sought and secured in the construction illustrated as an embodiment of the principles of my invention.

Referring to the accompanying drawings, the meter or weighing apparatus embodying my invention includes a casing including the parts A and B, suitably bolted or otherwise secured together with a ground-joint between the meeting edges thereof. An opening C is formed centrally through the part B of the casing and which constitutes the discharge-opening of the casing. Centrally of the part A of the casing is formed an opening D, constituting the supply-opening for the admission of the material to be weighed or measured. The opening B of the casing, which I will term the "base" portion or part, is provided with lugs or standards E, preferably cast or formed integrally therewith, through which are tapped pivot-screws F, the points of which constitute the pivot-bearings for the weighing-pans. The weighing-pan in the particular form shown, to which, however, the invention is not to be limited or restricted, includes the compartments G H, separated by a central partition-plate J. The bearing-standards E and pivot-studs F and partition-plate J of the weighing-pan are so relatively arranged as to be included in the same vertical plane when the pan stands in exactly-balanced position; but when the pan is tipped or rocked in one direction or the other one or the other of the compartments G H is brought into position to receive the material through the inlet-opening D of the cap part A of the casing. The cap part A of the casing is provided with a cup-shaped extension K, adapted to receive thereover a cap L, having an opening M therethrough and centrally thereof and preferably in direct line with the openings D and C, as well as with the vertical plane of pivot-screws F. From this construction it will be seen that a direct vertical line of connection is provided whereby the meter or weighing-machine apparatus may be interposed in convenient position in the length of a pipe or other connection from a source of supply and to a tank or reservoir.

Many different ways may be devised which will serve the purpose of enabling the material to be delivered to the compartments G H uniformly and without danger of the pressure or flow of the material disturbing the accuracy of the measurements or weighing indications of the apparatus. I have shown a simple arrangement for accomplishing this purpose, wherein I place within the cup extension K of the casing a series of division-plates N, each alternate plate having openings therethrough adjacent to the periphery thereof, while the intermediate plates have central openings. From this construction it will be seen that the material delivered through the opening M of cap L will be caused to traverse a zigzag path until it reaches the inlet-opening D of casing A, thereby enabling the material to be delivered into one or the other of the weighing-pans G H under uniform conditions of supply. If desired and in order to prevent the ingress of sediment, sand, dirt, or the like in the case of measuring water or other fluids, a screen O may be placed between the cap L and the cup-shaped extension K of the part A of the casing.

As above indicated, it is important that the weighing operation be completed before the train of gearing which actuates the registering apparatus is set in motion. Many specifically-different constructions and arrangements may be devised for accomplishing this purpose. I have shown a simple and efficient arrangement wherein a double-crank shaft P is suitably journaled in the side of casing A, the crank Q on one end of said shaft being located and operating within casing A and the crank R on the other end of said shaft being arranged to operate outside of the casing. The free end of crank Q is forked or bifurcated, as indicated in dotted lines at S, Fig. 1, and arranged to operate between the forked arms of said crank is a pin or stud A', carried by the tipping pan, the forked end of crank-arm Q affording sufficient lost motion to enable the tipping pan to rock or swing sufficiently far to become overbalanced under the weight of the material supplied or delivered to one or the other of the compartments thereof before the pin A' engages the forked end of crank-arm Q, the rocking or tipping movement of the weighing-pan causing pin A' to engage the forked end of crank Q, and thereby rocking the shaft P and with it the other crank-arm R thereof. The clockwork mechanism of the meter or indicator is indicated generally by reference-sign B' and is set in motion by the rocking movement imparted to the crank-arm R.

The construction of the clockwork mechanism and of the meter or registering mechanism is unimportant and in the specific details forms no part of my present invention, and hence specific description thereof is unnecessary, it being understood that any simple, suitable, well-known, or convenient form of clockwork or train mechanism would answer the purpose, said train of mechanism being put in operation upon each rocking movement imparted to the crank-arm R.

Many specifically-different arrangements may be provided for preventing undue shock or jar as the tip-pan completes its tipping movement. In Fig. 1 I have shown one arrangement for accomplishing this result, wherein a dash-pot chamber C' is formed in the inner surface of the base-plate B of the casing adapted to receive a plunger or other projection D', carried by the tipping tank. As shown, each of the compartments G H is provided with the plunger D', and a cushion-chamber C' is provided for each of these plungers. The dash-pot chambers C' may be provided with small openings E', through which air, water, or other fluid confined in said chambers may slowly escape, thus constituting, in effect, a dash-pot. It is obvious that other forms of cushioning means may be employed. For instance, in Fig. 4 I have shown an inverted cup or chamber F' connected to the bottom of the tipping tank and which when the tipping tank is rocked or tipped enters the fluid or water, where the device is employed for measuring liquids in inverted position and by compression of the air thus confined in the inverted cup F' forms an air-cushion for the tipping tank. If desired, means may be provided for adjustably regulating the extent of tipping movement of the pans. I have shown a simple means for accomplishing this result, wherein adjustable set-screws G' are tapped through the base part B of the casing and adjustable from the outside, whereby said screws may be set to limit the extent of rocking or swinging movement of the tipping pans, as may be desired.

A weighing device or meter of the construction above described is adapted for use in weighing or measuring any commodity—such, for instance, as water, oil, or other fluid or liquid, grain, coal, or the like. It is of special value as a weighing or measuring device for measuring the supply of heat delivered to a customer in the form of hot water or steam in a heat-distributing plant. In Fig. 5 I have indicated the use of such device in connection with a heat-distributing system, wherein steam is distributed from a boiler H' through a distributing main or pipe J', thence to a radiator K' or other point of use, thence to a return-pipe L', in which, if desired, may be located a trap M', through the meter, (indicated generally by reference-sign N',) a pump O', to a reservoir or receiving-tank P', from whence return is made to the boiler. In this special application of a meter or weighing measure of the character described it will be obvious that the water of condensation of the steam supplied to the consumer is required to pass through the meter on its return to the boiler or reservoir and by measuring the water of condensation by weight the quantity of steam supplied may be calculated. It is obvious that instead of running the water of condensation to the boiler it may be discharged to waste, if desired. By employing a pump P' in connection with the system a vacuum may be maintained in the return or exhaust pipes, thus maintaining circulation of the heating medium and enabling the meter to be applied with facility to a heat-distributing system wherein the steam is delivered from a central station to a wide area or territory, and by returning the water of condensation from the heating appliances to the boiler the heat units of the water of condensation are saved, thus avoiding waste. In case of the use of a weighing device or meter of the character and nature shown and described in connection with a vacuum system or circulation it is necessary and desirable that the crank-shaft P be efficiently packed in its bearing formed through the side of casing B, and hence in accordance with the principles of my invention I arrange said shaft P to rock within a suitably-packed stuffing-box, thereby preventing waste or inaccuracy arising through waste of material or liquid weighed or passing through the weighing-machine. It will be obvious that where water is the commodity being weighed or measured the cushion-chambers C' are constantly maintained full by reason of the flange Q' surrounding the opening C on the inside of the part B of the casing, the material collecting in the bottom of the casing until it overflows the upper edge of flange Q'.

It is believed that the operation of the apparatus will be readily understood from the foregoing description, and briefly is as follows: The material—such, for instance, as the water of condensation in a steam-heat-distributing system—is admitted to the apparatus through the opening M in cap L, thence passing through the netting or gauze O, and in a zigzag course or path through the division or partition plates N, finally being delivered to the casing through the opening D of case A, the delivery being uniform and without danger of interfering with the accurate measurement thereof. The material thus delivered drips or flows into the compartment H of the apparatus in the particular location shown in the drawings and continues to accumulate therein until the weight thereof is sufficient to overbalance the tipping pan, and when this point is reached the weighing is completed, the pan tips, and as it gathers momentum in its tipping or rocking movement the pin A', carried by the pan, engages eventually the forked end of crank-arm Q, thereby rocking shaft P, and hence setting in motion the train of register mechanism through crank-arm R or otherwise. At the same time the partition-plate J separates the compartments G H, passes to the other side of the opening D, and thereafter the material is delivered into the compartment G of the tipping pan. As the tipping pan approaches its limit of tipping or rocking movement the plunger D' in the case of the construction shown in Fig. 1 enters its corresponding cushion-compartment C' and cushions the tipping movement of the pan, the pan being finally brought to a rest in its adjusted position against the adjusting-screw G', and in case of the construction shown in Fig. 4 the inverted cup F' confines air therein as it enters the water, filling the lower portion of the casing, the compression of such air so confined serving to form a cushion for the tipping pan. The water or other material contained in the compartment H flows out of such compartment or is delivered therefrom through the opening R' in the end thereof, such material overflowing the flange Q' and exhaust through opening C' to the pump, whence it is returned to the reservoir or boiler or to waste, as may be desired.

By constructing the casing in the manner shown and above described of separable parts adapted to be bolted together the manufacture of the casing is greatly facilitated, and after the parts are once assembled the apparatus may be conveniently adjusted without taking the apparatus apart. It will also be seen that the only friction opposing the rocking movement of the tipping pan is the friction of the bearing of the points of the pivot-screws F, the pan not being required to overcome the friction of the registering or indicating mechanism.

Many variations and changes in the details of construction and arrangement would readily occur to persons skilled in the art and still fall within the spirit and scope of my invention. I do not desire, therefore, to be limited or restricted to the exact details of construction and arrangement shown; but, Having now set forth the object and nature of my invention and a construction embodying the principles thereof and having explained such construction, its purpose, function, and mode of operation, what I claim as new and useful and of my own invention, and desire to secure by Letters Patent, is—

1. In a tip-tank weighing-machine or meter, a casing made in separable parts and having a base, the said base part of the casing having a discharge-opening therethrough, and a flange surrounding the inner mouth of said opening, a tipping pan pivotally mounted within said casing and means operatively related to the pan, whereby the motion of the tank is cushioned, as and for the purpose set forth.

2. In a tip-tank weighing-machine or meter, a casing made in separable parts adapted to be secured together and having supply and exhaust openings arranged in line with each other, the base part of said casing having integral lugs, pivot-bolts tapped through said lugs, and a tipping pan pivotally supported by said bolts, the axis of said bolts intersecting the line between said openings, as and for the purpose set forth.

3. In a tip-tank weighing-machine or meter, a casing provided with an inlet, a tipping pan pivotally mounted to oscillate therein, the said casing having threaded openings in the bottom thereof, adjusting-screws disposed in said openings and within the path of movement of the pan, and lock-nuts mounted on said screws to secure the same in position.

4. In a tip-tank weighing-machine or meter, a casing, a tipping pan pivotally mounted to oscillate therein, a cushion-chamber carried by said tipping tank and coöperating with the fluid contained in the casing to cushion said tank in the oscillating movements thereof.

5. In a tip-tank weighing-machine or meter, a casing having supply and exhaust openings, a tipping pan pivotally mounted to oscillate within said casing, and a compartment having a series of division-plates adjacent the supply-opening, for delivering the material to be weighed or measured uniformly to said tipping pan.

6. In a tip-tank weighing-machine or meter, a casing having supply and exhaust openings, a tipping pan pivotally mounted to oscillate within said casing, a flange surrounding the inner mouth of said discharge-opening, whereby water is retained within the casing, and means carried by said pan and coöperating with the water for cushioning the tipping movement of said pan, as and for the purpose set forth.

7. In a tip-tank weighing-machine or meter, a casing having supply and exhaust openings, a tipping pan pivotally mounted within said casing, a chamber from which said supply-opening delivers, and means arranged within said chamber for causing the material to traverse a zigzag path before delivery into said casing, the delivery-opening of said casing being located in the vertical plane of the pivot-pin, as and for the purpose set forth.

8. In a tip-tank weighing-machine or meter, a casing having supply and exhaust openings, a tipping pan pivotally mounted to oscillate within said casing, a chamber from which said opening delivers into said casing, and partitions arranged within said chamber and having peripheral openings through alternate partitions and central openings through the intermediate partition, whereby the material supplied is caused to traverse a zigzag path in order that it may be delivered uniformly to the tipping pan.

9. In a tip-tank weighing-machine or meter, a casing having supply and exhaust openings, a tipping pan pivotally mounted to oscillate within said casing, a chamber through which said supply-opening delivers, a cap for said chamber, and a screen comprising a series of plates separated slightly from one another, and disposed adjacent the opening.

10. In a tip-tank weighing-machine or meter, a casing having supply and exhaust openings, a tipping pan pivotally mounted to oscillate within said casing, a chamber from which said supply-opening delivers, partitions arranged within said chamber and having openings therethrough, the openings in alternate partitions being near the periphery and of the intermediate partitions being centrally with respect to said partitions, a screen also arranged within said chamber, and a cap for said chamber.

11. In a tip-tank weighing-machine or meter, a rocking pan, a stud carried thereby, a rock-shaft, a crank-arm carried thereby and having a forked end, said stud operating within the fork of said arm to produce lost motion whereby when said pan is rocked through a sufficient distance said arm is engaged and said shaft rocked, a registering mechanism, and means actuated by the rocking of said shaft for operating said registering mechanism.

12. In a tip-tank weighing-machine or meter, a casing, a tipping pan pivotally mounted within said casing and carrying a stud, a shaft arranged to extend within said casing and having a crank-arm, said crank-arm being forked, said stud operating between the forks of said arm, a recording mechanism arranged outside of said casing, and means actuated by the rocking movements of said shaft for operating said recording mechanism, as and for the purpose set forth.

13. In a tip-tank weighing-machine, a casing having inlet and discharge orifices, a flange surrounding the discharge-orifice, whereby a body of liquid is retained in said casing, a tank, and means coöperating with said liquid for cushioning the movements of said tank, as and for the purpose set forth.

14. In a tip-tank weighing-machine, a casing having inlet and discharge orifices, the discharge-orifice surrounded with a flange, whereby a body of liquid is retained within the casing, a tip-tank, and damping devices upon said tank coöperating with said liquid, as and for the purpose set forth.

15. In a tip-tank weighing-machine, a casing having an integral chamber with a delivery-orifice into the casing, a plurality of partitions disposed in staggered relation within said chamber for reducing the velocity of the liquid to be measured, and a tip-tank having top and end orifices for the admission and discharge of the liquid.

16. In a tip-tank weighing-machine, a casing having a chamber, an elongated orifice leading from the chamber into the casing, and a screen, a tip-tank having a substantially diamond-shaped contour pivotally mounted to oscillate in said delivery-chamber and in close proximity to said elongated orifice, said tank provided with admission and delivery orifices.

17. In a tip-tank weighing-machine, a casing having a flanged bottom provided with a delivery-orifice having a surrounding flange, whereby a body of liquid is retained on said flat bottom, a tip-tank pivoted in said casing, and means upon said tip-tank for coöperating with the body of liquid in the casing and cushioning the movements of said tank, as and for the purpose set forth.

In witness whereof I have hereunto set my hand, this 11th day of July, 1903, in the presence of the subscribing witnesses.

WILLIAM H. PEARCE.

Witnesses:
   CHAS. H. SEEM,
   S. E. DARBY.